United States Patent [19]

Thompson et al.

[11] 4,173,762

[45] Nov. 6, 1979

[54] REFERENCE SIGNAL GENERATING APPARATUS

[75] Inventors: Vernal W. Thompson, Bountiful; Wilbert C. Anderson, Salt Lake City, both of Utah

[73] Assignee: Sperry Rand Corporation, New York, N.Y.

[21] Appl. No.: 914,466

[22] Filed: Jun. 12, 1978

[51] Int. Cl.² .......................... H01Q 3/10; H01Q 3/12; G01S 5/02
[52] U.S. Cl. .................................. 343/759; 343/761; 343/118
[58] Field of Search ................. 343/7.4, 118, 759, 761

[56] References Cited

U.S. PATENT DOCUMENTS

| | | | |
|---|---|---|---|
| 2,959,060 | 11/1960 | Kune | 250/231 GY |
| 3,445,663 | 5/1969 | Jones et al. | 250/203 R |
| 3,519,827 | 7/1970 | Chitayat | 250/202 |
| 3,549,897 | 12/1970 | Blake | 250/231 SE |
| 3,697,183 | 10/1972 | Knight et al. | 356/150 |
| 3,731,104 | 5/1973 | Todd et al. | 343/7.4 |
| 3,778,833 | 12/1973 | Castrovillo et al. | 343/118 |
| 3,849,698 | 11/1974 | Frohbach | 250/231 SE |
| 4,041,483 | 8/1977 | Groff | 250/231 SE |
| 4,090,181 | 5/1978 | Ansari et al. | 340/271 |

FOREIGN PATENT DOCUMENTS 751137   6/1956   United Kingdom ................... 343/7.4

*Primary Examiner*—Alfred E. Smith
*Assistant Examiner*—Harry E. Barlow
*Attorney, Agent, or Firm*—John P. Dority; William E. Cleaver; Marshall M. Truex

[57] ABSTRACT

Apparatus for generating elevation and azimuth reference signals for use in demodulating a tracking error signal to provide elevation and azimuth error components for use in adjusting the position of a tracking conical scan radar antenna, includes a template ring having a notched periphery and being attached to a rotatable nutator of the antenna such that its peripheral notches are in a predetermined angular phase relationship with a reference position on a feed horn attached on the nutator, during rotation of the feed horn with the nutator. The apparatus further includes an optical transducer and electronic circuitry coupled thereto for producing the reference signals from a signal generated by the transducer in response to rotation of the ring with the nutator. As the ring rotates with the nutator, its notched periphery makes or breaks a photon path between light beam generating and sensing elements of the transducer. The sensing element then generates the signal which is received by the electronic circuitry. In addition to the two reference signals produced by the circuitry, a sync signal is generated and used internally within the circuitry to insure that the reference signals produced are in a proper phase relationship to the reference position on the feed horn of the nutator during rotation thereof.

10 Claims, 4 Drawing Figures

REFERENCE SIGNAL GENERATING APPARATUS

The Government has rights in this invention pursuant to Contract No. F33657-75-C-0276 awarded by the Department of the Air Force.

BACKGROUND OF THE INVENTION

1. Field of the Invention

The present invention broadly relates to reference signal generating apparatus and, more particularly, is concerned with provision of such apparatus for generating elevation and azimuth reference signals to be utilized in demodulating a tracking error signal for making corrective adjustment of the position of a tracking conical scan radar antenna.

2. Description of the Prior Art

In a conical scan radar scheme, it is desired that the beam radiated by the antenna swing symmetrically around the target for precise tracking of the target. A low frequency portion of the signal received back by the radar receiver is used within the antenna servo system to provide a DC signal which contains information as to the tracking error or deviation from an exactly symmetrical circling position of the beam relative to the target. This tracking error signal is supplied to an elevation demodulator and an azimuth demodulator. Also, elevation and azimuth reference signals are generated and inputted to the respective demodulators to separate out the components of the tracking error signal which relate to elevation error and azimuth error. These separated components of the tracking error signal outputted by the respective demodulators are then used to drive servo motors for repositioning the antenna to track the target precisely in elevation and azimuth.

Heretofore, a reference signal generator of the armature and windings type has been used for generating the elevation and azimuth reference signals. This generator was mounted to the back side of the antenna assembly and was gear driven by the central nutator shaft of the assembly so as to rotate in one-to-one phase relationship with the angular rotational position of the nutator feed horn, during rotation of the nutator shaft, which produces the conical scan path of the antenna beam.

One disadvantage with this prior art arrangement is that the generator takes up a lot of space on the antenna assembly. Another disadvantage is that it is difficult to ensure that the generator is being driven by the gearing precisely in the desired phase relationship with the nutator feed horn.

SUMMARY OF THE INVENTION

The present invention is related to the provision of an improved apparatus for generating reference signals, such as the elevation and azimuth reference signals, while avoiding the disadvantages associated with the prior art type generator.

The improved apparatus, in its preferred form, is comprised by the combination of an electronic reference generator circuit, an optical transducer and a notched ring being mounted on a driven pulley connected to the nutator of the antenna assembly, which combination replaces the need for the prior art type generator and its associated drive gears.

By keying directly to its notched ring attached to the driven pulley of the nutator, the apparatus of the present invention ensures that the reference signals generated are in the exact desired phase relationship with the angular rotational position of the nutator feed horn and also provides a savings in the space required to accommodate the apparatus on the antenna assembly, especially in connection with its use on smaller diameter, lighter weight antenna assemblies. Further, the apparatus represents a savings in cost over the prior art type generator.

Accordingly, in combination with a mechanism, such as a radar tracking antenna, having a frame, a member, such as a nutator device, mounted on the frame for rotation relative to the frame about a longitudinal axis and means for rotating the member, wherein the member includes an element, such as a feed horn, which revolves about the longitudinal axis as the member is rotated about the axis, the present invention provides an improved apparatus for generating a pair of reference signals which are ninety degrees out of phase with one another and in a desired phase relationship to the angular position of the element during rotation of the member.

The apparatus includes the combination of reference means attached on the member for rotation therewith about the axis, transducer means mounted on the frame adjacent the reference means and electrical circuitry coupled to the transducer means.

The reference means includes first, second and third edge portions being disposed relative to one another for movement in a generally common rotational path upon rotation of the member. The second edge portion extends outwardly from and ninety degrees about the periphery of the member and has a pair of opposite ends. The third edge portion extends outwardly from and ninety degrees about the periphery of the member and has a pair of opposite ends with each end being displaced ninety degrees from a corresponding one of the opposite ends of the second edge portion. The first edge portion extends outwardly from the periphery of the member and is disposed between, but displaced at its opposite ends at known angular distances from, a corresponding one pair of the opposite ends of the second and third edge portions. Also, the first edge portion is located at a reference position on the member having a known angular displacement from the position of the element on the member such that the second and third edge portions are thereby disposed in a known phase relationship to the angular position of the element during rotation of the member.

The transducer means is mounted on the frame adjacent the rotational path of the edge portions of the reference means for sensing both the presence and absence of any one of the edge portions in predetermined close proximity to the transducer means during movement of the edge portions in the path upon rotation of the member. Further, the transducer means is operable to generate an electrical signal having a first state in response to sensing the presence of any one of the edge portions in the predetermined close proximity to the transducer means and a second state in response to sensing the absence of any one of the edge portions in the predetermined close proximity to the transducer means.

The electrical circuitry receives the electrical signal generated by the transducer means and is operable to generate from that signal a pair of reference signals being ninety degrees out of phase with one another and a sync signal for causing the reference signals to be generated in the desired phase relationship to the angular position of the element during rotation of the member.

DETAILED DESCRIPTION OF THE INVENTION

Introduction

Figure 1:
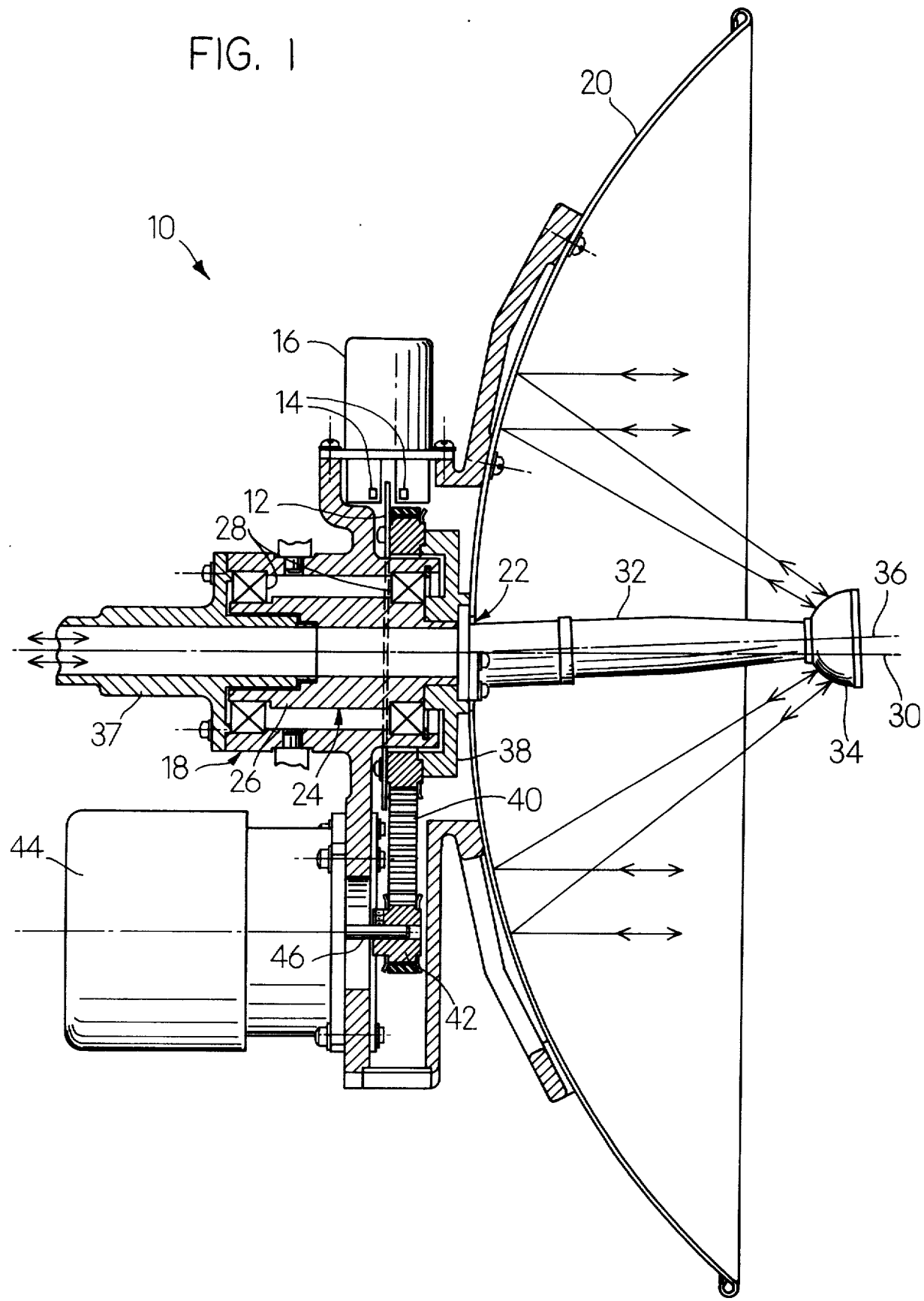
FIG. 1 is a side elevational view, partly in section, of a tracking conical scan radar antenna assembly incorporating the reference signal generating apparatus of the present invention.

Referring now to the drawings, and in particular to FIG. 1, there is illustrated a conventional tracking conical scan radar antenna assembly, generally designated 10, to which a preferred embodiment of the improved reference signal generating apparatus of the present invention is applied. The improved apparatus, as seen in FIG. 1, includes a reference ring 12, an optical transducer 14 and a reference signal generating circuit 16. However, before entering into a detailed description of the preferred form of the improved generating apparatus, the arrangement of the conventional tracking antenna assembly 10 to which the invention is applied will be briefly described.

The Tracking Antenna Assembly

The antenna assembly 10 of FIG. 1 includes a frame 18 at the front side of which is attached a parabolic antenna dish 20 having a central opening 22 formed therethrough. The frame 18, only a portion of which is shown in FIG. 1, is supported by an antenna positioning mechanism (not shown) through operation of which repositioning of the antenna assembly 10 can be carried out for precise tracking of a target both in elevation and azimuth. The assembly 10 also includes a nutator device, generally designated 24, having a central hub 26 being journalled on the frame 18 by a pair of spaced apart annular bearings 28 for rotation relative to the frame 18 about a longitudinally-extending central axis 30 of the nutator device 24. At the forward end of the nutator hub 26 is attached a feed horn 32 which extends through the central opening 22 of the dish 20 and has at its outer end a head element 34 from which RF energy is radiated toward the antenna dish 20 and also, at separate intervals, received from the same, as depicted by the bi-directional arrows in FIG. 1.

It will be noted in FIG. 1 that the axis 36 of the elongated body of the feed horn 32 diverges from the central axis 30 of the nutator device 24. This divergent relationship disposes the feed horn head element 34 in a position in which its center is offset from the nutator axis 30. Such offset position of the head element 34 causes it to revolve in a circle about the central nutator axis 30 and the beam radiated out from the antenna dish 20 to move or revolve in a conical scan path as the nutator device 24 is rotated. Also, it will be observed that RF energy is transmitted to and from the feed horn head element 34 through a continuous waveguide structure formed by the hollow body of the feed horn 32, the hollow interior of the nutator device hub 26 and a waveguide tube 37 which is coupled to the rear side of the frame 18 and is only shown in fragmentary form in FIG. 1. The tube 37 is, in turn, coupled with other energy generating and receiving equipment, not shown.

For rotating the nutator hub 26 and revolving the feed horn 32 attached thereto about the central nutator axis 30, there is provided a driven pulley 38, a drive belt 40, a driving pulley 42 and a nutator drive motor 44. The driven pulley 38 is received about and affixed to the front portion of the nutator hub 26 for rotation therewith. The nutator drive motor 44 is mounted to a lower extension of the antenna frame 18 and has a forwardly-extending drive shaft 46. The driving pulley 42 is affixed to the forward end of the drive shaft 46 and in vertical alignment with the driven pulley 38 of the nutator device 24. The driving and driven pulleys 42, 38 are interconnected by the drive belt 40. Therefore, rotation of the motor drive shaft 46 is transmitted by the pulleys 38, 42 and belt 40 so as to cause simultaneous rotation of the nutator hub 26 and revolution of the feed horn 32 about the nutator central axis 30.

Improved Reference Signal Generating Apparatus

It will be recalled that a low frequency portion of the signal received back by the antenna dish 20 and transmitted via the nutator feed horn 32 and associated waveguide structure to a receiver (not shown) coupled to the waveguide structure must be demodulated to provide a DC signal which has been earlier called the tracking error signal. This low frequency signal contains information as to the tracking error or deviation of the beam radiated from the antenna assembly 10 from an exactly symmetrical circling position about the target. This signal is supplied to an elevation demodulator and an azimuth demodulator for separating out the components of the tracking error which relate to elevation error and azimuth error. These separated out error component signals are then used to control the drive of the azimuth and elevation servo motors of the antenna positioning mechanism for repositioning the antenna assembly 10 to a correct azimuth and elevation tracking position.

However, in order to be able to separate out the elevation and azimuth error components of the tracking error signal, reference signals must be provided to the demodulators which precisely reflect the angular position of the nutator feed horn 32 during its revolution about the central nutator axis 30. The improved generating apparatus of the present invention is designed to provide such precise reference signals.

As briefly mentioned above, the improved generating apparatus is comprised by three basic parts: a reference ring 12, an optical transducer 14 and a reference signal generating circuit 16.

The reference ring 12 is a thin annular-shaped template or disc which has a series of three notches 52, 48 and 50 defined about the periphery thereof. The notches are defined between first, second and third peripheral edge portions 58, 54 and 56 of the reference ring 12. The ring 12 is attached on the rear side of the nutator hub 26, as seen in FIG. 1, for rotation therewith about the nutator axis 30 in a counterclockwise direction when viewed from the front of the antenna assembly 10. The first, second and third edge portions 58, 54 and 56 of the ring are disposed in a common plane for movement in a generally common rotational path upon rotation of the nutator hub 26.

Figure 2:
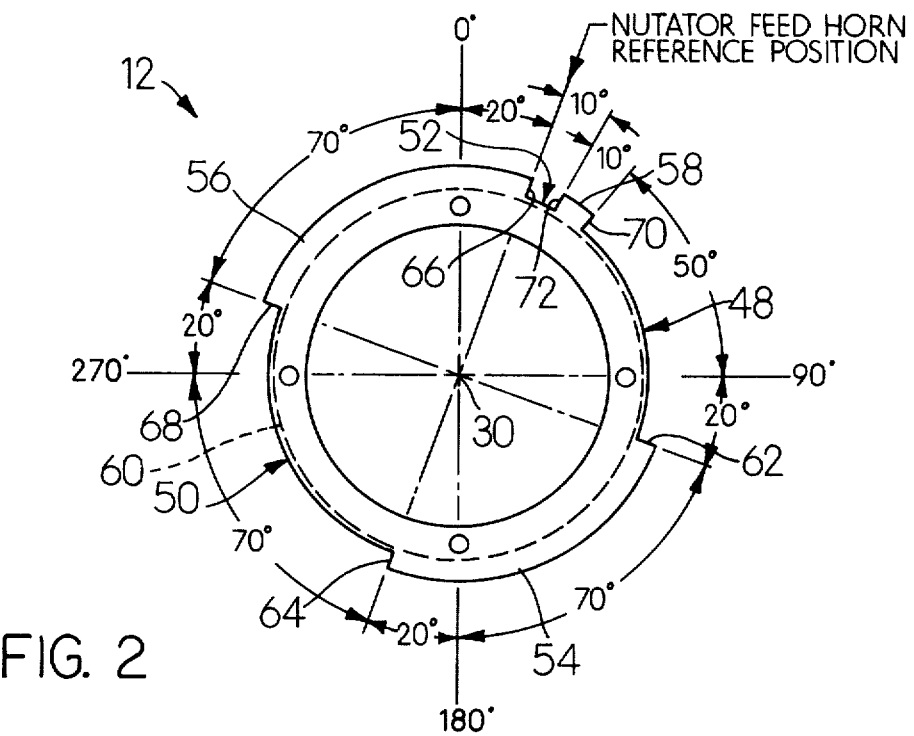
FIG. 2 is a plan view of the ring of the generating apparatus, illustrating its peripheral notched configuration.

As seen in FIG. 2, the second edge portion 54 of the ring 12 extends outwardly from and ninety degrees about the periphery 60 of the nutator hub 26 and has a pair of opposite ends 62, 64 which extend perpendicular to the central nutator axis 30. The third edge portion 56 of the ring 12 extends outwardly from and ninety degrees about the periphery 60 of the nutator hub 26 and has a pair of opposite ends 66, 68 which extend perpendicular to the central nutator axis 30. Each of the opposite ends 66, 68 of the third edge portion 56 are displaced ninety degrees from a corresponding one of the opposite ends 62, 64 of the second edge portion 54. The first edge portion 58 of the ring 12 extends outwardly from the periphery 60 of the nutator hub 26 and is disposed between, but displaced at its opposite ends 70, 72 at known angular distances from, a corresponding one pair, 62 and 66, of opposite ends of the second and third edge portions 54, 56. In the preferred form of the ring 12, the one end 70 of the first edge portion 58 is displaced seventy degrees from the one end 62 of the second edge portion 54 and the opposite end 72 of the first edge portion 60 is displaced ten degrees from the corresponding one end 66 of the third edge portion 56.

Therefore, as seen in FIG. 2, the second notch 48 is defined between the one end 62 of the second edge portion 54 and the one end 70 of the first edge portion 58. The third notch 50 is defined between the opposite one end 64 of the second edge portion 54 and the opposite end 68 of the third edge portion 56. The first notch 52 is defined between the one end 66 of the third edge portion 56 and the opposite one end 72 of the first edge portion 58.

The reference ring 12 is attached on the rear side of the nutator hub 26 such that its first edge portion 58 is at a reference position having a known angular displacement from the nutator feed horn head element 34; and, thus, its second and third edge portions 54, 56 are disposed in a known phase relationship to the angular position of the feed horn head element 34 during rotation of the nutator device 24. In the preferred form, the one end 66 of the third edge 56 is aligned with the center of the feed horn head element 34 and is therefore always at the same angular position as the center of the head element 34 as it circles about the central axis 30 during rotation of the nutator device 24. The purpose for these particular preferred phase relationships of the edge portions 54, 56, 58 with the center of the feed horn head element 34 will become apparent from the description of the reference signal generating circuit 16 which follows hereinafter.

The optical transducer 14 is comprised by a light beam generating or emitting component 74, such as a light emitting diode, and a light beam sensing or detecting component 76, such as a phototransistor. The components 74, 76 are mounted to the frame 18 in spaced apart positions, as shown schematically in FIG. 1, which allow passage of the periphery of the reference ring 12 therebetween. In their positions adjacent the rotational path of the edge portions 54, 56, 58 of the ring 12, the components 74, 76 cooperate to both sense the presence and absence of any one of the edge portions 54, 56, 58 in predetermined close proximity to the components 74, 76 (such being the zone of space between the components) during movement of the edge portions in the path during rotation of the nutator device 24.

Specifically, as the ring 12 rotates with the nutator device 24, its notched periphery makes or breaks the photon beam path emanating between the emitting and detecting components 74, 76. As a consequence, the detecting component 76 generates an electrical signal output having a first level or state in response to sensing the presence of any one of the ring edge portions between the components 74, 76, that is, when the photon beam is broken by the ring periphery preventing light from reaching the detecting component 76, and a second level or state in response to sensing the absence of any one of the ring edge portions between the components 74, 76, that is, when the photon beam is not interrupted by the ring periphery allowing light to reach the detecting component 76.

Figure 4:
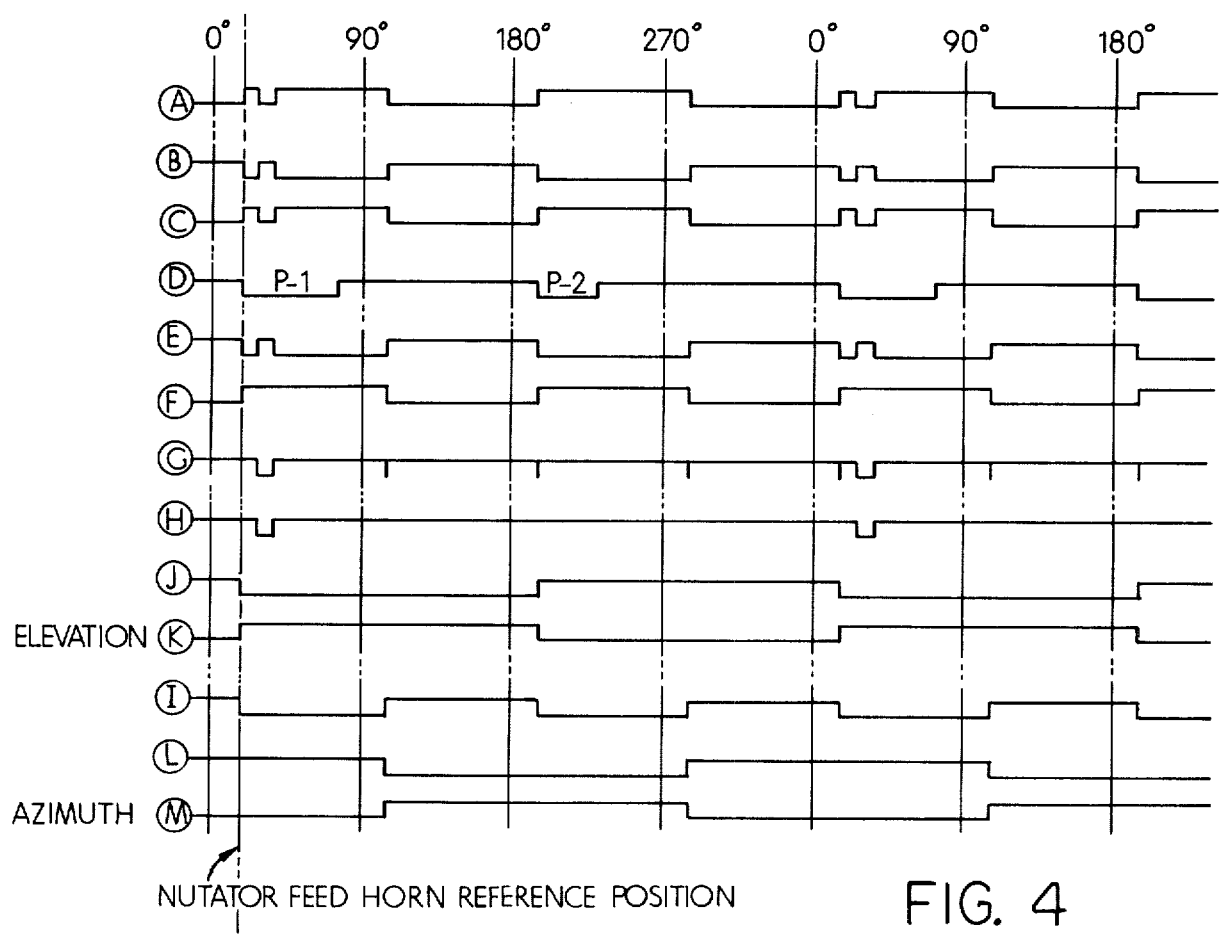
FIG. 4 is a timing diagram depicting the relationships between the various waveforms of signals produced by the transducer and circuit of FIG. 3 during operation of the generating apparatus.
Figure 3:
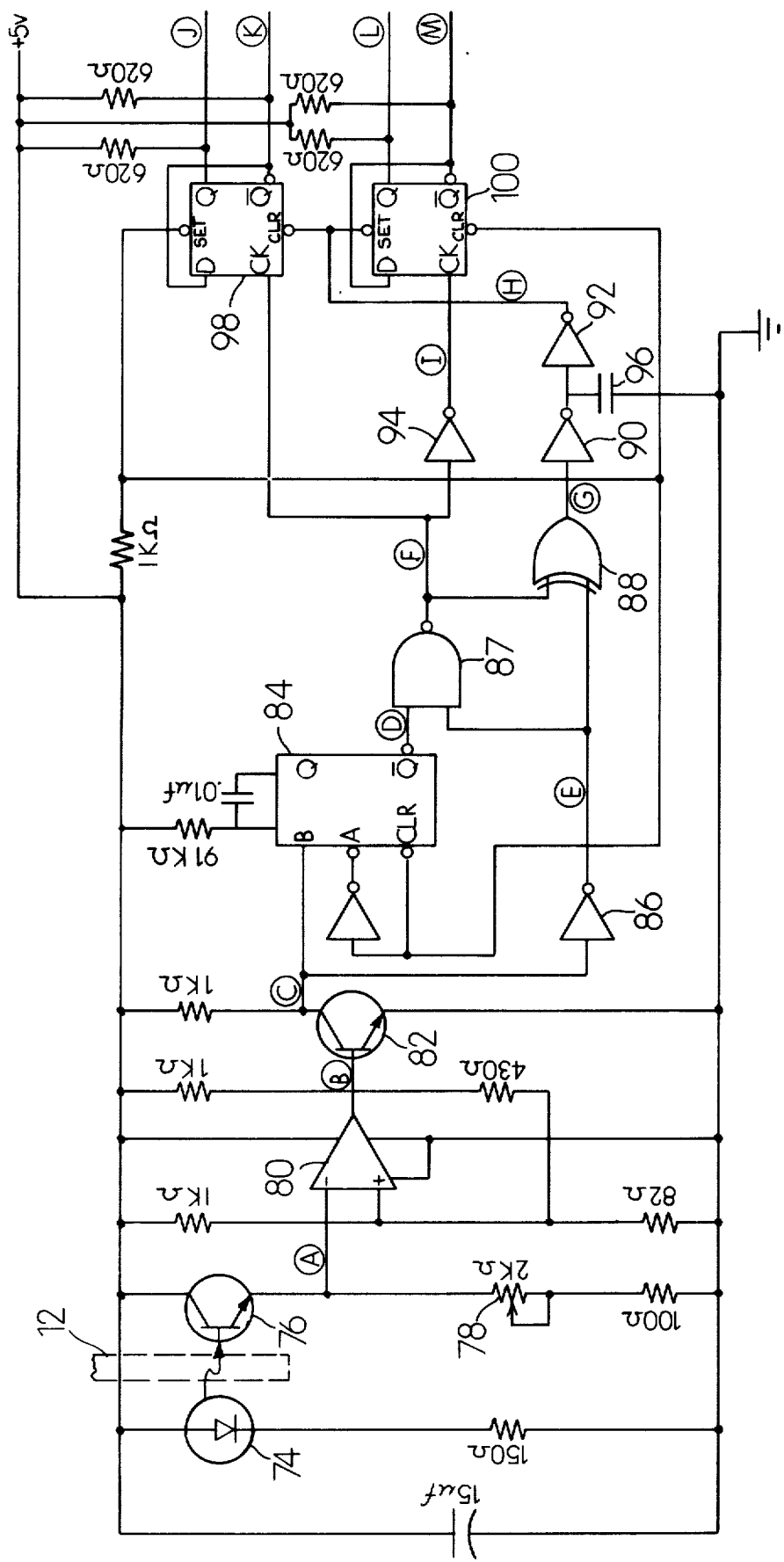
FIG. 3 is a detailed schematic diagram of the electrical circuit and optical transducer of the generating apparatus.

Referring now to FIGS. 3 and 4, the electrical signal generated by the detecting component 76 is represented by waveform A. The signal A is at a high state during the absence of the ring periphery from between the components 74, 76, or, in other words, when the light from the emitting component 74 reaches the detecting component 76. The signal A is at a low state during the presence of the ring periphery between the components 74, 76, or, in other words, when the light is interrupted by any one of the edge portions 54, 56 or 58 and prevented from reaching the detecting component 76.

The reference signal generating circuit 16, as seen in FIG. 3, is coupled to the detecting component 76 and receives the electrical signal A generated by the latter. The circuit 16 is operable to generate from the signal A, as seen in FIG. 4, a first pair of reference signals, designated as J and L, and a second pair of reference signals, designated as K and M, where each signal of a pair is ninety degrees out of phase with the other signal of the same pair. Also, the circuit 16 is operable to generate from the signal A, a sync signal H which causes the reference signals of each of the pairs thereof to be generated in desired predetermined phase relationships to the angular position of the feed horn head element 36 about the central nutator axis 30 during rotation of the nutator device 24. Thus, the sync signal H is used internally within the circuit 16. The J and K signals represent elevation reference signals, while the L and M signals represent azimuth reference signals.

The parts of the circuit 16 for producing the above-mentioned reference and sync signals will now be described in detail in reference to FIG. 3 and the timing diagram of FIG. 4.

The circuit 16 includes a resistor 78 which is preset to provide the desired threshold levels for the detecting component 76 and a comparator 80 (type LM111) which has its negative inverting input connected between the output of the detecting component 76 and the resistor 78 for receiving the signal A outputted by the component 76. The comparator 80 functions to square up the positive and negative transitions of the signal A as well as to invert the signal A so as to provide a signal B, having a waveform as shown in FIG. 4, at its output.

The circuit 16 further includes a transistor 82, functioning as a driver as well as an inverter, which receives signal B and outputs signal C. The waveform of signal C is now in logic format. It is used to drive a retrigerable one-shot monostable multivibrator 84 (type 96L02) of the circuit 16. The signal C is also inverted by a first inverter 86 (type 54L04). The outputs of the multivibrator 84 and first inverter 86 are respectively represented by waveforms of signals D and E of FIG. 4. Also, it should be noted that the triggered output pulse of the multivibrator 84 is retriggered by a positive-going transition of signal C which occurs when the transducer 14 detects the end 70 of the first edge portion 58 of the ring 12. This positive transition follows twenty degrees after an earlier positive-going transition of the signal C which initially triggered the multivibrator 84, as seen in FIG. 4. The earlier positive transition and triggering of the negative-going edge of the first one-shot pulse waveform portion P-1 of signal D occurred when the transducer 14 detected the end 66 of the third edge portion 56 of the ring 12, such being aligned with the center of the feed horn head element 34. Once the multivibrator 84 has returned to its stable state (upon occurrence of the positive-going edge of first pulse P-1), a second later positive transition of the signal C triggers it again, producing the second one-shot pulse waveform portion P-2 of the signal D. This later positive transition occurs when the transducer 14 detects the end 64 of the second edge portion 54 of the ring 12. As seen in FIG. 4, the first one-shot pulse portion P-1 of signal waveform D is longer in duration than that of the second one-shot pulse portion P-2. However, the retriggering of the first one-shot pulse P-1, and hence its greater length than pulse P-2, does not serve any purpose in the circuit 16, as will be seen below; it merely is a characteristic of the particular type of multivibrator used.

The circuit 16 further includes a NAND gate 87 (type 96L02), an EXCLUSIVE OR gate 88 (type 54L86), second, third and fourth inverters 90, 92 and 94 (type 54L04), a capacitor 96, and first and second flip-flops 98 and 100 (type 5474).

Output signals D and E, having the waveforms shown in FIG. 4, are fed from the $\overline{Q}$ output of the multivibrator 84 and from the output of the first inverter 86 to the inputs of the NAND gate 87. The output F of the NAND gate 87 goes to a high state whenever either or both of its input levels D and E go low, as seen in FIG. 4.

Here it will be seen that even if the one-shot pulse portion P-1 of waveform D had been of the shorter length of its pulse portion P-2, the result would be the same. In other words, the length of low pulse portion P-2 would be sufficient to keep output signal F of the NAND gate high although the signal E goes high when the transducer 14 detects the presence of the first edge portion 58 of the reference ring 12.

The output signal F from the NAND gate 86 and also the output signal E from the first inverter 86, in the timing relationships shown in FIG. 4, are received at the inputs of EXCLUSIVE OR gate 88. The gate 88 outputs a signal G having a waveform, as seen in FIG. 4, which is high if either, but not both, of its input signal E or F is high. It will be noted that momentary spikes appear in waveform of signal G due to the coincidently-occurring positive and negative transitions in the signals E and F. The signal G is fed through the second and third inverters 90 and 92 and past a capacitor 96 such that the transition spikes are eliminated and the resulting signal H outputted from the third inverter 92 has a low pulse portion which occurs once each rotational cycle of the nutator device 24 at the angular position thereof represented by the first edge portion 58 of the reference ring. This low pulse portion of the signal H provides the sync pulse for ensuring that the output states of the flip-flops 98 and 100 are in the desired phase relationship to the angular position of the nutator device 24 during each of its rotational cycles.

The output signal F from the NAND gate 87 provides clock pulses to the CK input of the first flip-flop 98 and is also inverted by a fourth inverter 94 to provide a signal I which supplies clock pulses to the CK input of the second flip-flop 100. The clock pulses to the respective flip-flops 98 and 100 are represented by the positive-going transitions contained in the waveforms of signals E and I, as shown in FIG. 4.

The first or upper flip-flop 98 provides a pair of elevation reference signals J and K on its outputs, while the second or lower flip-flop 100 provides a pair of azimuth reference signals L and M on its outputs. The $\overline{Q}$ outputs of the flip-flops 98 and 100 are coupled back to their respective D inputs. Thus, the successive arrivals of clock pulses (positive transitions in signals E and I) at their CK inputs cause the flip-flops 98 and 100 to toggle between high and low states.

Due to the inverted relationship of the waveform of signal I to that of signal F, the clock pulses of the signal F lead the clock pulses of signal I by ninety degrees. The low pulse portion of the signal H which is received at the clear input CL of the first or elevation flip-flop 98 and at the SET input of the second or azimuth flip-flop 100 insures that positive transitions on the Q output of the elevation flip-flop 98 will lead positive transitions on the Q output of the azimuth flip-flop 100, and that the same will be true with respect to the $\overline{Q}$ outputs of the flip-flops 98 and 100. Thus, while the $\overline{Q}$ outputs and accordingly the D inputs of the flip-flops 98 and 100 might be respectively low and high for some reason at the start of the first cycle of rotation of the nutator device 24, and therefore not correctly representing the angular phase relationship of the reference ring 12 and feed horn head element 34, the occurrence of the low pulse portion of the signal H during the initial rotational cycle of the nutator device 24 will respectively clear and set the $\overline{Q}$ outputs of the flip-flops 98 and 100 to high and low states and the respective Q outputs to low and high states so as to ensure that they will represent the desired elevation and azimuth phase relationships of the reference ring to the feed horn head element 34 on the nutator device 24. Once the proper phase relationships are established, the repetitive clearing and setting of the respective flip-flops 98 and 100 have no effect on their respective outputs so long as they remain in the proper phase relationships.

The outputting of two elevation reference signals J and K and two azimuth reference signals L and M merely allows one to phase couple with any demodulator one desires. In this particular application of the generating apparatus, the elevation reference signal K is the one selected for use at the elevation demodulator, while the azimuth reference signal M is the one selected for use at the azimuth demodulator. But, depending on the situation, the desired phasing in some other system could be such that one would want to use reference signals J and L instead.

Also, it should be mentioned that the 0 degree position in FIG. 2 and the graph of FIG. 4 represent a reference position of the receive-back signal at the demodulators. The reason for attachment of the reference ring 12 to the nutator hub 26 in the specific phase relationship of FIG. 2 such that the respective ends of the second and third edge portions 54 and 56 of the ring 12 each lag corresponding 0 degree, 90 degree, 180 degree and 270 degree positions of the received-back signal by 20 degrees, and thereby the positive and negative edges of the elevation and azimuth reference signals lag the corresponding portions of the received-back signal at the demodulators by 20 degrees, is that so a phase shifter (not shown) used with one particular application of the improved generating apparatus which can only delay the received-back signal up to 40 degrees can now be used for making a plus or minus 20 degree adjustment of the received-back signal with respect to the reference signals. Thus, by delaying the received-back signal by 20 degrees, it is placed in exact synchronism with the reference signals. Other phase relationships can be established merely by selecting a different angular position of the reference ring 12 of the nutator device 24.

In summary, the generating circuit 16 of the improved apparatus produces from the electrical signal output of the transducer 14 four square wave signals, two representing elevation reference signals and two representing azimuth reference signals, from which a pair of corresponding elevation and azimuth reference signals, which are 90 degrees out of phase with one another, are selected for use at the elevation and azimuth demodulators respectively for separating out the elevation and azimuth components of the tracking error signal. Also, the circuit 16 produces from the electrical signal output of the transducer 14 a synchronizing signal which is used internally within the circuit 16 to ensure that the reference signals are generated in a known phase relationship from which will be known the actual angular position of the nutator feed horn 32 (in elevation and azimuth) at any time during its revolution about the nutator axis 30.

Having thus described the invention, what is claimed is:

1. In combination with a mechanism, such as a radar tracking antenna, having a frame, a member, such as a nutator device, mounted on said frame for rotation relative to said frame about a longitudinal axis and means for rotating said member, said member including an element thereon, such as a feed horn, which revolves about said axis as said member is rotated about said axis, an apparatus for generating a pair of reference signals being ninety degrees out of phase with one another and in a desired phase relationship to the angular position of said element during rotation of said member, said apparatus comprising:

reference means attached on said member for rotation therewith about said axis, said reference means including first, second and third edge portions being disposed relative to one another for movement in a generally common rotational path upon rotation of said member, said second edge portion extending outwardly from and ninety degrees about the periphery of said member and having a pair of opposite ends, said third edge portion extending outwardly from and ninety degrees about the periphery of said member and having a pair of opposite ends with each end being displaced ninety degrees from a corresponding one of said opposite ends of said second edge portion, said first edge portion extending outwardly from the periphery of said member and being disposed between, but displaced at its opposite ends at known angular distances from, a corresponding one pair of said opposite ends of said second and third edge portions, said first edge portion being located at a reference position on said member having a known angular displacement from said element of said member such that said second and third edge portions are thereby disposed in a known phase relationship to the angular position of said element during rotation of said member;

transducer means mounted on said frame adjacent the rotational path of said edge portions of said reference means for sensing both the presence and absence of any one of said edge portions in predetermined close proximity to said transducer means during movement of said edge portions in said path upon rotation of said member, said transducer means being operable to generate an electrical signal in response to sensing the presence of any one of said edge portions in said predetermined close proximity to said transducer means and in response to sensing the absence of any one of said edge portions in said predetermined close proximity to said transducer means; and electrical circuitry coupled to said transducer means and receiving said electrical signal generated by said transducer means, said electrical circuitry being operable to generate from said electrical signal a pair of reference signals being ninety degrees out of phase with one another and a sync signal for causing said reference signals to be generated in the desired phase relationship to the angular position of said element during rotation of said member.

2. The combination as recited in claim 1, wherein said transducer means includes light beam generating and sensing elements, said light beam generating element being mounted on said frame adjacent one side of said rotational path of said edge portions of said reference means and said light beam sensing element being mounted on said frame adjacent an opposite side of said rotational path, said sensing element generating said electrical signal in response to receipt of a light beam from said generating element during the absence of one of said edge portions of said reference means from between said generating and sensing elements and in response to non-receipt of said light beam during the presence of one of said edge portions between said generating and sensing elements.

3. The combination as recited in claim 1, wherein said electical circuitry includes:

a first circuit portion coupled to said transducer means for producing, from said signal generated by said transducer means, first and second series of clock pulses being ninety degrees out of phase with one another;

a second circuit portion coupled to said first circuit portion for receiving said first series of clock pulses from said first circuit portion, said second circuit portion being arranged to toggle between first and second output states upon successive receipt of the clock pulses in said first series thereof and produce a first of said pair of reference signals during each rotation cycle of said member; and a third circuit portion coupled to said first circuit portion for receiving said second series of clock pulses from said first circuit portion, said third circuit portion being arranged to toggle between first and second output states upon successive receipt of the clock pulses in said second series thereof and produce a second of said pair of reference signals during each rotation cycle of said member, wherein transitions of said second reference signal between said first and second states are ninety degrees out of phase with corresponding transitions of said first reference signal.

4. The combination as recited in claim 3, wherein said electrical circuitry further includes:
   a fourth circuit portion coupled to said first circuit portion for receiving said first series of clock pulses therefrom and to said transducer means for receiving said signal generated by said transducer means, said fourth circuit portion for generating, upon receipt of said signal and said first series of clock pulses, said sync signal during each rotation cycle of said member, said fourth circuit portion also being coupled to said second and third circuit portions for outputting said sync signal thereto and thereby causing said second and third circuit portions, in toggling between said first and second output states, to produce said first and second reference signals in the desired phase relationship to the angular position of said element during each rotation cycle of said member.

5. In combination with a tracking conical scan radar antenna having a frame, a nutator device mounted on said frame for rotation relative to said frame about a longitudinal axis and means for rotating said nutator device, said nutator device including a feed horn thereon which revolves about said axis as said nutator device rotated about said axis, an apparatus for generating a pair of reference signals in a desired phase relationship to the angular position of said feed horn during rotation of said nutator device, said apparatus comprising:
   a reference ring having a series of notches formed on its periphery, said ring being attached to said nutator device such that its peripheral notches are in a predetermined angular phase relationship with a reference position on said feed horn of said nutator device;
   an optical transducer including light beam generating and sensing elements mounted on said frame adjacent said ring such that, as said ring rotates with said nutator device, its notched periphery makes or breaks the path of a light beam between said elements, said light beam sensing element generating an electrical signal in response to said making and breaking of said light beam path representing the angular position of said ring and thereby said nutator feed horn during each rotational cycle of said nutator device; and
   electrical circuitry coupled to said transducer sensing element and receiving said electrical signal for generating a pair of reference signals and a sync signal which is used in said circuitry to cause said reference signals to be generated in said desired phase relationship to the angular position of said feed horn during rotation of said nutator device.

6. The combination as recited in claim 5, wherein said electrical circuitry includes:
   a first circuit portion coupled to said transducer sensing element for producing, from said signal generated by said sensing element, first and second series of clock pulses being ninety degrees out of phase with one another;
   a second circuit portion coupled to said first circuit portion for receiving said first series of clock pulses from said first circuit portion, said second circuit portion being arranged to toggle between first and second output states upon successive receipt of the clock pulses in said first series thereof and produce a first of said pair of reference signals during each rotation cycle of said nutator device; and
   a third circuit portion coupled to said first circuit portion for receiving said second series of clock pulses from said first circuit portion, said third circuit portion being arranged to toggle between first and second output states upon successive receipt of the clock pulses in said second series thereof and produce a second of said pair of reference signals during each rotation cycle of said nutator device, wherein transitions of said second reference signal between said first and second states are ninety degrees out of phase with corresponding transitions of said first reference signal.

7. The combination as recited in claim 6, wherein said electrical circuitry further includes:
   a fourth circuit portion coupled to said first circuit portion for receiving said first series of clock pulses therefrom and to said transducer sensing element for receiving said signal generated by said sensing element, said fourth circuit portion for generating, upon receipt of said signal and said first series of clock pulses, said sync signal during each rotation cycle of said nutator device, said fourth circuit portion also being coupled to said second and third circuit portions for outputting said sync signal thereto and thereby causing said second and third circuit portions, in toggling between said first and second output states, to produce said first and second reference signals in the desired phase relationship to the angular position of said feed horn during each rotation cycle of said nutator device.

8. In combination with a tracking conical scan radar antenna having a frame, a nutator device mounted on said frame for rotation relative to said frame about a longitudinal axis and means for rotating said nutator device, said nutator device including a feed horn thereon which revolves about said axis as said nutator device rotated about said axis, an apparatus for generating reference signals in desired phase relationships to the angular position of said feed horn during rotation of said nutator device, said apparatus comprising:
   a reference ring having a series of notches formed on its periphery, said ring being attached to said nutator device such that its peripheral notches are in a predetermined angular phase relationship with a reference position on said feed horn of said nutator device;
   an optical transducer including light beam generating and sensing elements mounted on said frame adjacent said ring such that, as said ring rotates with said nutator device, its notched periphery makes or breaks the path of a light beam between said elements, said light beam sensing element generating an electrical signal in response to said making and breaking of said light beam path representing the angular position of said ring and thereby said nutator feed horn during each rotational cycle of said nutator device; and
   electrical circuitry coupled to said transducer sensing element and receiving said electrical signal for generating first and second pairs of reference signals and a sync signal which is used in said circuitry to cause said reference signals to be generated in said desired phase relationships to the angular position of said feed horn during rotation of said nutator device.

9. The combination as recited in claim 8, wherein said electrical circuitry includes:
- a first circuit portion coupled to said transducer sensing element for producing, from said signal generated by said sensing element, first and second series of clock pulses being ninety degrees out of phase with one another;
- a second circuit portion coupled to said first circuit portion for receiving said first series of clock pulses from said first circuit portion, said second circuit portion having two outputs which toggle between first and second states upon successive receipt of the clock pulses in said first series thereof and produce said first pair of reference signals during each rotation cycle of said nutator device being one hundred eighty degrees out of phase with one another; and
- a third circuit portion coupled to said first circuit portion for receiving said second series of clock pulses from said first circuit portion, said third circuit portion having two outputs which toggle between first and second states upon successive receipt of the clock pulses in said second series thereof and produce said second pair of reference signals during each rotation cycle of said nutator device being one hundred eighty degrees out of phase with one another, wherein transitions of each of said reference signals in said first pair thereof between said first and second states are ninety degrees out of phase with corresponding transitions of the corresponding one of said reference signals in said second pair thereof.

10. The combination as recited in claim 9, wherein said electrical circuitry further includes:
- a fourth circuit portion coupled to said first circuit portion for receiving said first series of clock pulses therefrom and to said transducer sensing element for receiving said signal generated by said sensing element, said fourth circuit portion for generating, upon receipt of said signal and said first series of clock pulses, said sync signal during each rotation cycle of said nutator device, said fourth circuit portion also being coupled to said second and third circuit portions for outputting said sync signal thereto and thereby causing said outputs of said second and third circuit portions, in toggling between said first and second states, to produce said pairs of reference signals in the desired phase relationships to the angular position of said feed horn during each rotation cycle of said nutator device.

* * * * *